Figure 6:
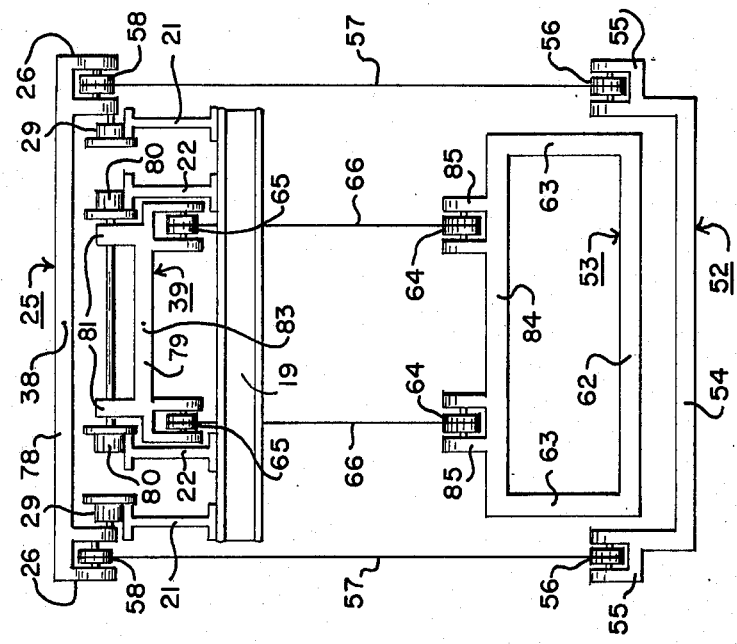

United States Patent [19]

Brock

[11] 3,999,672
[45] Dec. 28, 1976

[54] OVERRUNNING YOKE SELF-LOADING CARRIER

[76] Inventor: Gibson E. Brock, R.D. 5 Persimmon Road, Sewickley, Pa. 15143

[22] Filed: Apr. 30, 1975

[21] Appl. No.: 573,127

[52] U.S. Cl. .................... 214/396; 212/14; 212/85
[51] Int. Cl.² ........................................ B60P 3/40
[58] Field of Search ............... 214/394, 396, 15 R, 214/6 BA, 38 CA, 38 CC, 82, 85; 212/11, 14; 105/7

[56] References Cited

UNITED STATES PATENTS

| 982,883 | 1/1911 | Schnabel | 212/11 |
| 2,701,065 | 2/1955 | Bertel | 214/6 BA X |
| 3,718,263 | 2/1973 | Strecke | 105/7 X |
| 3,721,358 | 3/1973 | Brock | 214/394 |

Primary Examiner—Albert J. Makay
Attorney, Agent, or Firm—Buell, Blenko & Ziesenheim

[57] ABSTRACT

Apparatus for automatically picking up and transporting elongated loads having one end only raised above ground comprises a tractor-drawn trailer with an elevated bridge from which a pair of load supporting yokes is suspended. At least one of the yokes is suspended from a trolley movable lengthwise of the bridge and that yoke is suspended outside the other yoke so that when it is lowered below the other yoke it can be moved past it. The inside yoke may also be suspended from a trolley which moves along a path independent of the path of the first trolley.

5 Claims, 6 Drawing Figures

Fig. 2.

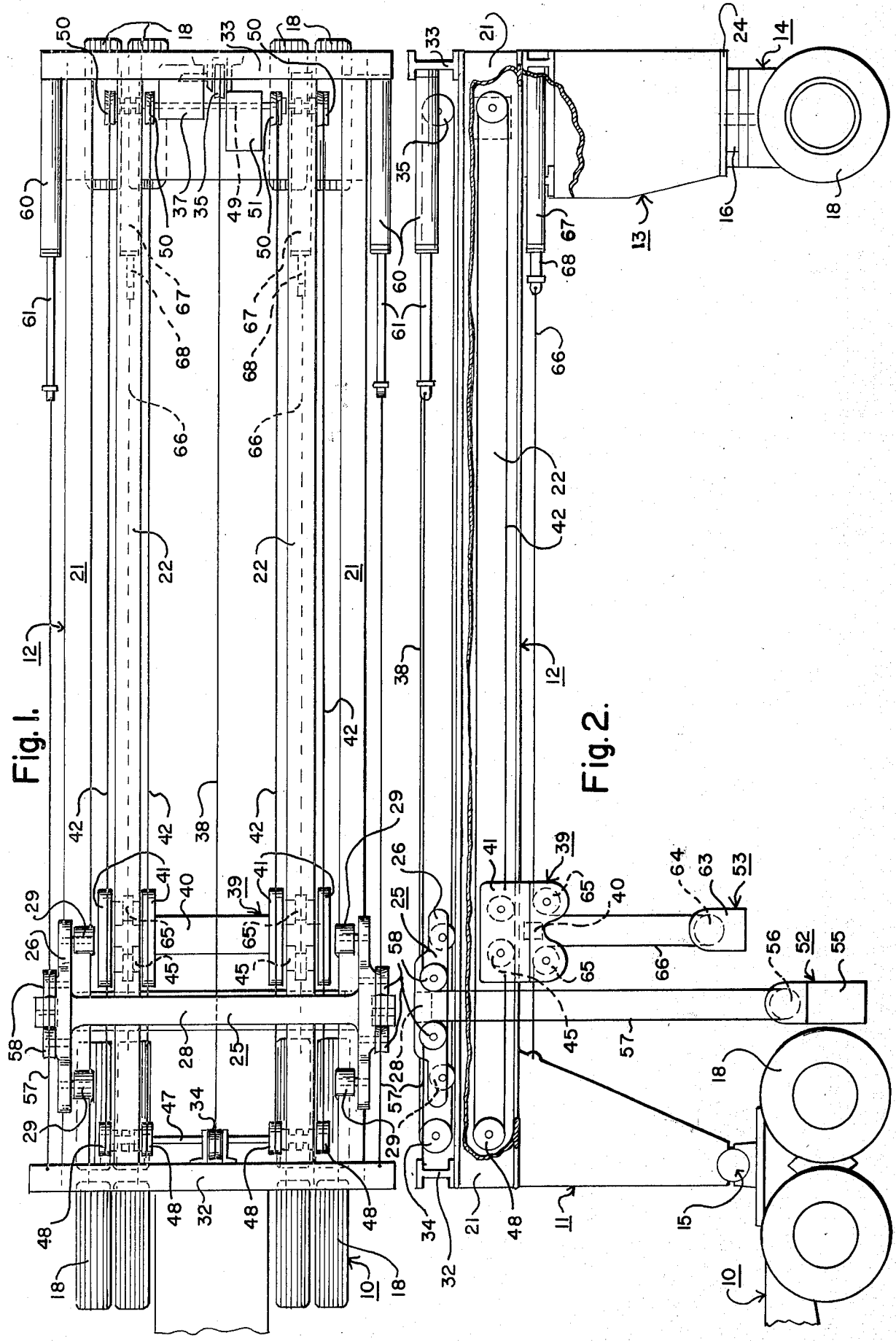

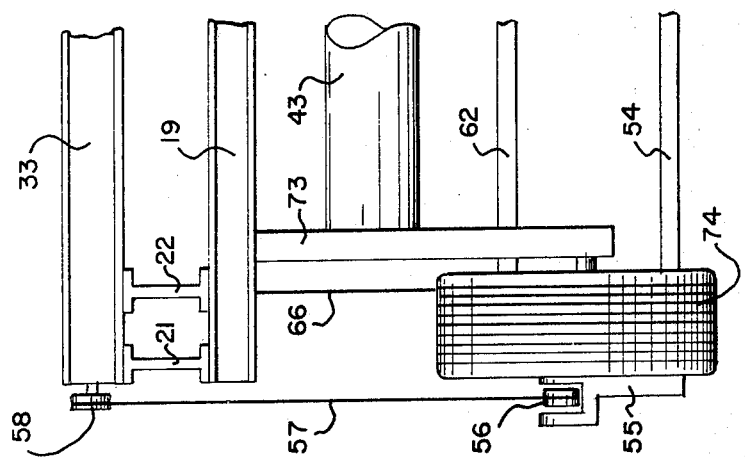
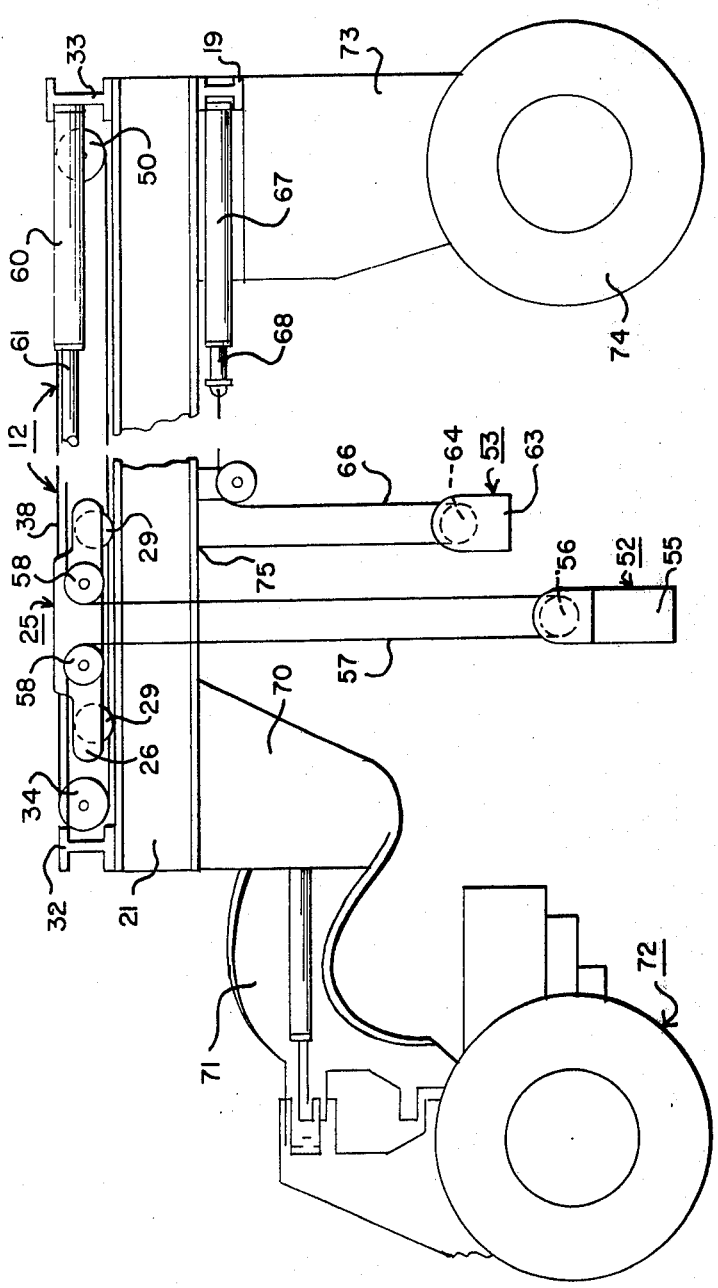

OVERRUNNING YOKE SELF-LOADING CARRIER

This invention relates to self-loading carriers for over-the-road in-plant transport of elongated loads. It is more particularly concerned with such a carrier provided with yoke type load-lifting devices which automatically pick up loads supported so that one end only is clear of the ground.

My invention is in several respects an improvement on the apparatus disclosed in my U.S. Pat. No. 3,721,358 of Mar. 20, 1973, which disclosure is incorporated herein and made a part hereof. Certain embodiments, however, are suitable for use, under favorable conditions, with a simpler type of trailer than is there described.

As pointed out in my patent, it is frequently necessary in manufacturing operations to stack elongated articles such as billets, bars, pipes, structural sections and the like between processing steps, or between manufacture and shipment. The cheapest way to stack such articles is on the ground. Conventionally, elongated articles are lifted by a crane through the use of sling chains or cables that must be passed beneath the load. The articles, therefore, must be stacked on blocks, or on a mound of earth from which both ends project, or, if on the ground, across a pair of trenches or ditches. In all cases, the slings must be passed manually under the load at locations near each end. The apparatus of my patent above-mentioned avoids this procedure by the use of pick-up yokes on trolleys which are moved in automatically under each end of the load. It requires therefore, that both ends of the load be clear of the ground, and the carrier must be longer than the longest load to be transported.

It is an object of my invention to provide a self-loading carrier for elongated objects which requires the load to be supported above ground at one end only. It is another object to provide such a carrier in which the trailer need not be longer than the longest load to be transported. Other objects will appear in the course of the description which follows.

My invention to be described hereinafter requires only one end of the load to be clear of the ground. The load may be raised at one end on a block or a mound of earth, or may extend over a trench or ditch, but the latter must be wide enough to clear the end of the load. Both load-lifting yokes are then moved into position under the load from its raised end only.

The load-lifting yokes of my apparatus depend from the trailer bridge. One or both are suspended from trolleys movable along the bridge, like the trolleys in my patent previously mentioned. However, in my invention to be described, these trolleys are movable along different but parallel paths so that each trolley can be moved the full length of the bridge irrespective of the position of the other trolley. The yokes are suspended one inside the other so that as one trolley passes the other its yoke is lowered or raised as the case may be so as to pass around or through the other yoke.

It is known to provide two pairs of rails, one pair inside the other or one above the other, and a carriage running on each pair so that either carriage can overrun the other. Such apparatus is disclosed in U.S. Pat. No. 549,581, issued to R. M. Fryer on Nov. 12, 1895 and U.S. Pat. No. 879,750 issued to G. Dippel et al on Feb. 18, 1908. The carriages of those patents do not, however, carry load-supporting yokes suspended beneath them. U.S. Pat. No. 3,718,263 issued to H. Strecke on Feb. 27, 1973, discloses a pair of carriages running on separate pairs of coplanar rails, each carriage provided with load-carrying means disposed below it, but those means cannot overrun or pass each other.

In the operation of my apparatus the trailer is maneuvered so that the stationary yoke, if one is stationary, is brought under the raised end of the load. That yoke is then raised, lifting that end of the load clear of the ground or its block. The overrunning yoke is then moved around and under the yoke first mentioned and under the now tilted load to a position near its other end. The overrunning yoke is then raised to level the load, and the load is transported in its traveling position. The load is set down again so that one end is clear of the ground in the reverse sequence of operations.

Embodiments of my invention presently preferred by me are illustrated in the attached drawings to which reference is now made.

Figure 3:
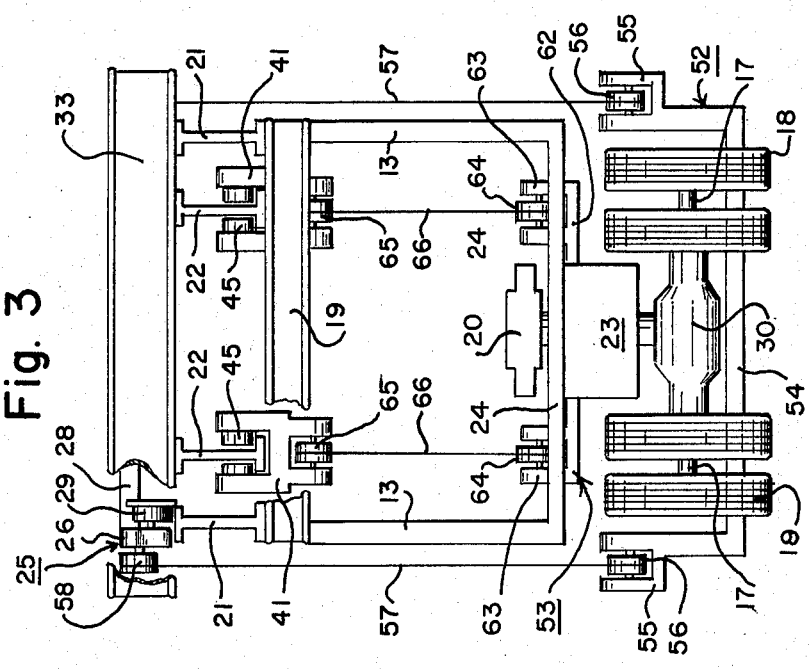

FIG. 1 is a plan of a first embodiment of my invention fitted to the vehicle disclosed in my U.S. Pat. No. 3,721,358 previously mentioned, FIG. 2 is a side elevation of the apparatus of FIG. 1, FIG. 3 is a rear end elevation of the apparatus of FIGS. 1 and 2, FIG. 4 is a side elevation of a second embodiment of my invention, FIG. 5 is a partial rear end elevation of the apparatus of FIG. 4, and FIG. 6 is a partial rear end elevation of a third embodiment of my invention, omitting some elements which are not essential to the understanding of that embodiment.

The vehicle of my apparatus comprises, broadly, three elements: a load-carrying unit or bridge 12 supported at its front end by front uprights 11, mounted on a tractor unit 10, and at its rear end by rear uprights 13, mounted on a trailing end unit 14. The rear uprights 13 support a cross member 19. The tractor unit 10 has a conventional internal combustion engine and is otherwise conventional. Front uprights 11 are mounted on tractor 10 by means of a compound bearing mechanism 15 which is described in my patent above mentioned and rear uprights 13 are mounted on trailing end unit 14 by a vertical pivot mechanism 16 carried by lower cross piece 24 and provided with a motor 20 for rotating trailing end unit 14 about pivot 16. Trailing end unit 14 is also provided with propulsion means 23 including a reverse gear connected through a conventional differential 30 to axles 17, upon which are mounted conventional rubber-tired wheels 18.

Front uprights 11 and rear uprights 13 are connected at their upper ends by an outer pair of parallel I-beams 21 and an inner pair of parallel I-beams 22, which are spaced apart relatively widely, but are spaced relatively closely to I-beams 21. A member 32 is positioned on those beams crosswise thereof above front uprights 11, and a like cross member 33 is positioned on the beams above rear uprights 13. The upper flanges of beams 21 form the tracks for an upper trolley 25 comprising a cross member 28 disposed above members 21, side members 26 each attached at one end of cross member 28 and extending at right angles thereto along bridge 12 and wheels 29 mounted pivotally on side members 26 so as to run on beams 21. On the inner face of cross member 32 is mounted a pulley 34 rotating freely in the vertical plane, and in line with it is a pulley 35 mounted on the inner face of cross member 33 and driven by a motor 37. An endless belt or cable 38 is fastened to cross member 28 of trolley 25 and is trained around pulleys 34 and 35.

The upper faces of the lower flanges of beams 22 form the tracks for a lower trolley 39 which comprises a cross beam 40 disposed below beams 22, and side members 41 each attached to cross member 40 on either side of each beam 22 and extending parallel to that beam. Each of the four side members 41 is provided with a pair of wheels 45 positioned to run on the upper side of the lower flange of beam 22 disposed between the side members.

A shaft 47 is journalled in the webs of beams 22 at their front end and is provided with pairs of pulleys 48 positioned one on each side of each beam 22. A shaft 49 is journalled in like fashion in the webs of beams 22 at their rear ends and is provided with pairs of pulleys 50 positioned one on each side of each beam 22. Shaft 49 is driven by motor 51. An endless belt or cable 42 is fastened to side piece 41 of trolley 39 and is trained around pulleys 48 and 50 on the same side of beam 22 as that side piece 41. A like belt 42 is fastened to the other side piece 41 and trained around pulleys 48 and 50 on the other side of beam 22. A pair of identical belts or cables 42 is likewise disposed and attached to the side pieces 41 at the other side of trolley 39.

A load-lifting yoke 52 is suspended from upper trolley 25 and a generally similar yoke 53 is suspended from lower trolley 39. Yoke 52 comprises a horizontal load-supporting member 54 disposed crosswise of bridge 12, terminated at each end by an upright clevis 55. The length of yoke member 54 is somewhat greater than the length of trolley cross member 28 which spans the outside distance between beams 21. In each clevis 55 is mounted a freely rotating pulley 56. Side members 26 of trolley 25 likewise support on their outside faces a pair of spaced apart freely rotating pulleys 58 vertically aligned with pulleys 56. Yoke 52 is suspended by a pair of cables 57 each attached at one end to the opposite ends of cross member 32 and trained over a pulley 58 of trolley 25, under a pulley 56 of yoke 52 below pulleys 58, over the other pulley 58 of the pair and is connected to an end of cross member 33 through a hydraulic cylinder 60 and piston rod 61.

The lower trolley 39 also carries a yoke 53 which also comprises a horizontal load-supporting member 62 which, however, is shorter than load supporting member 54 of yoke 52, spanning only the outside distance between beams 22. At each end of horizontal member 62 is an upright clevis 63 each carrying a freely rotating pulley 64. Outside pieces 41 of lower trolley 39 each carry a pair of spaced apart pulleys 65 vertically aligned with the pulleys 64. A pair of cables 66 is attached at one end to front upright 11 and each cable is trained over a pulley 65, under a pulley 64, over the other pulley 65 of the pair, and is connected to rear upright 13 through a hydraulic cylinder 67 and piston 68. Hydraulic cylinders 60 and 67 are connected at each end through conventional valves, not shown, to a source of hydraulic fluid under pressure, also not shown.

The first step in the operation of the embodiment of my apparatus described above is the manuevering of the vehicle to position bridge 12 above the load and parallel thereto. That procedure is the same as is described in my U.S. Pat. No. 3,721,358 and therefore will not be repeated here. Trolleys 25 and 39 are both moved to the end of bridge 12 corresponding to the raised end of the load. This movement is effected by operating motors 37 and 51 respectively. As trolley 39 is positioned below trolley 25 and is narrower, and as yoke 53 carried by trolley 39 is of shorter span than yoke 52 carried by trolley 25, the trolleys can be moved so that yoke 53 is inside yoke 52. The height above ground of yoke 52 is adjusted by admitting hydraulic fluid to cylinder 60 so as to move piston rods 61 to increase or decrease the effective length of the cables 67. It is evident that movement of trolley 25 along bridge 12 does not raise or lower yoke 52, but merely alters the relative lengths of the portions of cables 57 on each side of the trolley. The height above ground of yoke 53 is similarly adjusted by operating hydraulic cylinders 67.

Yoke 53 is moved under the raised end of the load and is then lifted to raise that end of the load above the ground or block on which it rested. Yoke 52 is then moved under yoke 53 and along the load in the space between the load and ground or block, to a position near the far end of the load. Yoke 52 is then lifted to level the load, and the load is transported in that position. It is put down on a block or the like in the reverse sequence of operations.

Where the extreme maneuverability of the vehicle of my U.S. Pat. No. 3,721,358 is not essential, the apparatus of my invention is adapted to the type of vehicle described and illustrated in my U.S. Pat. No. 3,863,791 of Feb. 4, 1975. As will become evident, the overall length of a vehicle of that type may be made appreciably less than that of the vehicle previously described herein. In this adaptation the apparatus of my invention may be somewhat simplified, as will also appear.

In this second embodiment of my invention shown in FIGS. 4 and 5 the vehicle comprises a load-carrying unit or bridge 12 having a first upright supporting structure 70 fitted with a forward pull yoke 71 which is pivotally mounted in both horizontal and vertical planes on a single axle tractor unit 72 of the type conventionally used for heavy earth-moving machinery. Tractor 72 will, therefore, not be described further. The rear end of bridge 12 is supported at each side by an upright 73 which carries at its lower end an individually mounted wheel assembly 74. Uprights 73 are connected by a transverse torque tube 43 positioned above the axis of the wheels 74. Uprights 73 and wheel assemblies 74 are spaced so that they can straddle a load. The structure of bridge 12 is otherwise the same as has been described for the first embodiment of my invention, and that description will not be repeated. All elements of this second embodiment which are the same as those of my first mentioned embodiment are identified by the reference characters previously applied thereto.

Bridge 12 is provided with an upper trolley 25 as before, which carries a load-lifting yoke 52 suspended below it, also as before. A second load-lifting yoke 53 is also carried by bridge 12, but it is not suspended from a trolley. The forward ends of cables 66 supporting yoke 53 are attached directly to the under sides of I-beams 22 at a point 75 intermediate uprights 70 and 73 but spaced from upright 70 sufficiently to permit yoke 52 to move vertically between yoke 53 and upright structure 70. The other ends of cable 66 are attached to pistons 68 of hydraulic cylinders 67 as before.

In operation this embodiment of my apparatus is backed over the load so that the load is straddled by wheel assemblies 74. The raised end of the load is toward the front end of the vehicle. Yoke 52 is moved toward the front end of bridge 12 under yoke 53 until it is clear of that yoke. Yoke 53 is lowered to a level below that of the raised end of the load, and the vehicle is backed over the load until yoke 53 is beneath its raised end. The vehicle is then stopped, yoke 53 is lifted to raise the end of the load clear of the block or the ground, and yoke 52 is then moved vertically to a position below yoke 53 and trolley 25 moved rearwardly along bridge 12 to carry yoke 52 under the load to a position rearward of its mid point and, generally, near its rear end. Yoke 52 is then lifted to level the load.

The arrangement of trolleys previously described is not the only arrangement suitable for my apparatus. Another suitable arrangement is shown in FIG. 6. As before, the elements which are the same as those previously described herein carry the same reference characters.

In this embodiment, upper trolley 25 comprises side members 26 each fitted with a pair of wheels 29 mounted on stub shafts and adapted to run on the upper flanges of outside beams 21 as before. Side members 26 are connected by an overhead cross member 78 which clears wheels 29. Cable 38 is attached to the mid point of cross member 78. Yoke 52 is suspended from trolley 25 by cables 57 which are carried by pulleys 58 mounted on side members 26, also as before. Yoke 52 has been described.

Lower trolley 39 comprises a pair of side members 81 each carrying a pair of outboard wheels 80 of the same character as wheels 29. Side members 81 are spaced apart by cross member 79 disposed below the axis of wheels 80 so as to cause wheels 80 to run on the upper flanges of inside beams 22. Wheels 80 are dimensioned so that cross member 78 of upper trolley 25 clears them as well as wheels 29. Trolley 39 is moved along beams 22 by a single cable 83 corresponding to cables 42 but attached to the center of cross member 79, and so can pass under cross member 78 of trolley 25. Trolley 39 is provided with a pair of pulleys 65 mounted on each side member 81 below wheels 80 and inside beams 22. Cables 66 pass over pulleys 65 as before, and support a yoke 53.

As the span between beams 22 may be relatively short, FIG. 6 also illustrates a different construction of yoke 53. As before, it comprises a load bearing cross member 62 terminating at each end in an upright member 63. The upper ends of members 63 are joined by an upper cross member 84 provided with upstanding clevises 85 spaced inwardly from each end. Each clevis 85 carries a pulley 64 aligned with pulleys 65 of trolley 19 and each cable 66 passes under a pulley 64. This construction permits yoke 53 to be wider than the space between beams 22.

It will be understood that the embodiments of my invention here described and illustrated are exemplary only. The vehicle of my first embodiment may be provided with one trolley only and the vehicle of my second embodiment may be provided with two trolleys. The trolleys may be of either type described herein. As the trolleys are not required to move when they are supporting a load they need not be provided with wheels but may slide on ways in the manner of the tool carriage of a lathe. It will also be apparent to those skilled in the art that the trolleys may be moved by means other than the cables described, for example, by hydraulic cylinder, screw and nut or like means, or by drive motors carried by the trolleys. The load-supporting yokes may be lifted by means other than the cables described, for example, by hydraulic cylinders as are disclosed in my Patent No. 3,721,358 mentioned herein.

In the foregoing specification I have described presently preferred embodiments of my invention; however it will be understood that my invention can be otherwise embodied within the scope of the following claims.

I claim:

1. An over-the-road vehicle adapted to pick up and transport an elongated load having one end only raised above ground comprising a tractor unit and a trailer unit comprising an elongated bridge pivotally mounted at its front end on the tractor and supported at its rear end by a pair of wheels, first and second yoke means for carrying an elongated load slung below the bridge, a trolley movable along the bridge, means for moving the trolley, first load-lifting means suspending the first yoke means below the trolley and second-load lifting means suspending the second yoke means below the bridge, the second load-lifting means being positioned inside the first load-lifting means, the second yoke means being adapted to pass under a raised end of the load, the first yoke means being wider than the second yoke means and being adapted to be moved by the trolley under the same raised end of the load and, when the second yoke means are lifted, under those second yoke means, to a position under the other end of the load.

2. Apparatus of claim 1 including a second trolley movable along the bridge in a path other than that of the first trolley and independent thereof, and means for moving the second trolley, the second load-lifting means being suspended from the second trolley.

3. Apparatus of claim 2 in which the second trolley moves in a path inside the path of the first trolley, the second load-lifting means are positioned inside the path of the second trolley, and the second yoke means are wider than the path of the second trolley.

4. Apparatus of claim 1 in which the pair of wheels is adapted to straddle a load as the trailer unit is backed thereover.

5. An over-the-road vehicle comprising a tractor unit and a trailer unit comprising an elongated bridge pivotally mounted at its front end on the tractor, and supported at its rear end by a pair of wheels, first and second yoke means for carrying an elongated load slung below the bridge, a trolley movable along the bridge, means for moving the trolley, first load-lifting means suspending the first yoke means below the trolley and second load-lifting means suspending the second yoke means below the bridge, the second load-lifting means being positioned inside the first load-lifting means so that the first yoke means are movable by their trolley from a position behind the second yoke means to a position in front of the second yoke means, the load lifting means comprising a pulley at each end of the yoke means, a pair of spaced apart pulleys at each side of the trolley, a pair of cables affixed to one end of the bridge, each cable being trained over one pulley of the trolley, under the corresponding pulley of the yoke and over the other pulley of the trolley, and being connected to the other end of the bridge by means movable with respect thereto.

* * * * *